United States Patent [19]

Hunter et al.

[11] 4,186,174

[45] Jan. 29, 1980

[54] PROCESS AND APPARATUS FOR OBTAINING A MORE CONCENTRATED SOLUTION OF A COMPONENT USING ION EXCHANGE BEDS

[75] Inventors: Robert F. Hunter, Burlington; Irving H. Spinner, Etobicoke, both of Canada

[73] Assignee: Eco Tec Limited, Toronto, Canada

[21] Appl. No.: 832,861

[22] Filed: Sep. 13, 1977

Related U.S. Application Data

[63] Continuation of Ser. No. 637,605, Dec. 4, 1975, which is a continuation of Ser. No. 249,857, May 3, 1972, abandoned.

[51] Int. Cl.[2] .............................................. C01G 37/12
[52] U.S. Cl. ...................................... 423/54; 423/607; 423/DIG. 14; 423/139; 423/1; 423/659; 210/31 R; 210/35; 210/24; 75/101 BE
[58] Field of Search ................ 423/54, 607, DIG. 14; 75/101 BE; 210/31 R, 35

[56] References Cited

U.S. PATENT DOCUMENTS

| | | | |
|---|---|---|---|
| 2,733,204 | 1/1956 | Costa | 423/54 |
| 3,156,644 | 11/1964 | Kunin | 75/101 BE |
| 3,382,169 | 5/1968 | Thompson | 210/35 X |
| 3,385,788 | 5/1968 | Hunter | 210/35 X |
| 3,386,914 | 6/1968 | Hunter | 210/35 X |
| 3,656,939 | 4/1972 | Boehm et al. | 75/101 BE |
| 3,658,470 | 4/1972 | Zievers et al. | 75/101 BE |
| 3,664,950 | 5/1972 | Saraceno et al. | 210/35 |

OTHER PUBLICATIONS

Krug, "Galvanotechnik", vol. 55, 1964, pp. 295–300.

*Primary Examiner*—Herbert T. Carter
*Attorney, Agent, or Firm*—Rogers, Bereskin & Parr

[57] ABSTRACT

A process and apparatus for obtaining a more concentrated solution of components such as chromium containing anions by the use of ion exchange beds. A solution containing the component to be concentrated is passed through a first bed in which the component is taken up. A second solution containing a component of opposite charge is passed through the first bed to take up the component from the first bed and then through a second bed capable of taking up the second component from the solution. The second solution is passed from the first bed directly to and through the second bed, and both beds are rinsed following passage of the second solution therethrough by passing a rinse solution through the second bed and then directly to and through the first bed in a direction opposite to the direction in which said second solution passed through the beds.

5 Claims, 2 Drawing Figures

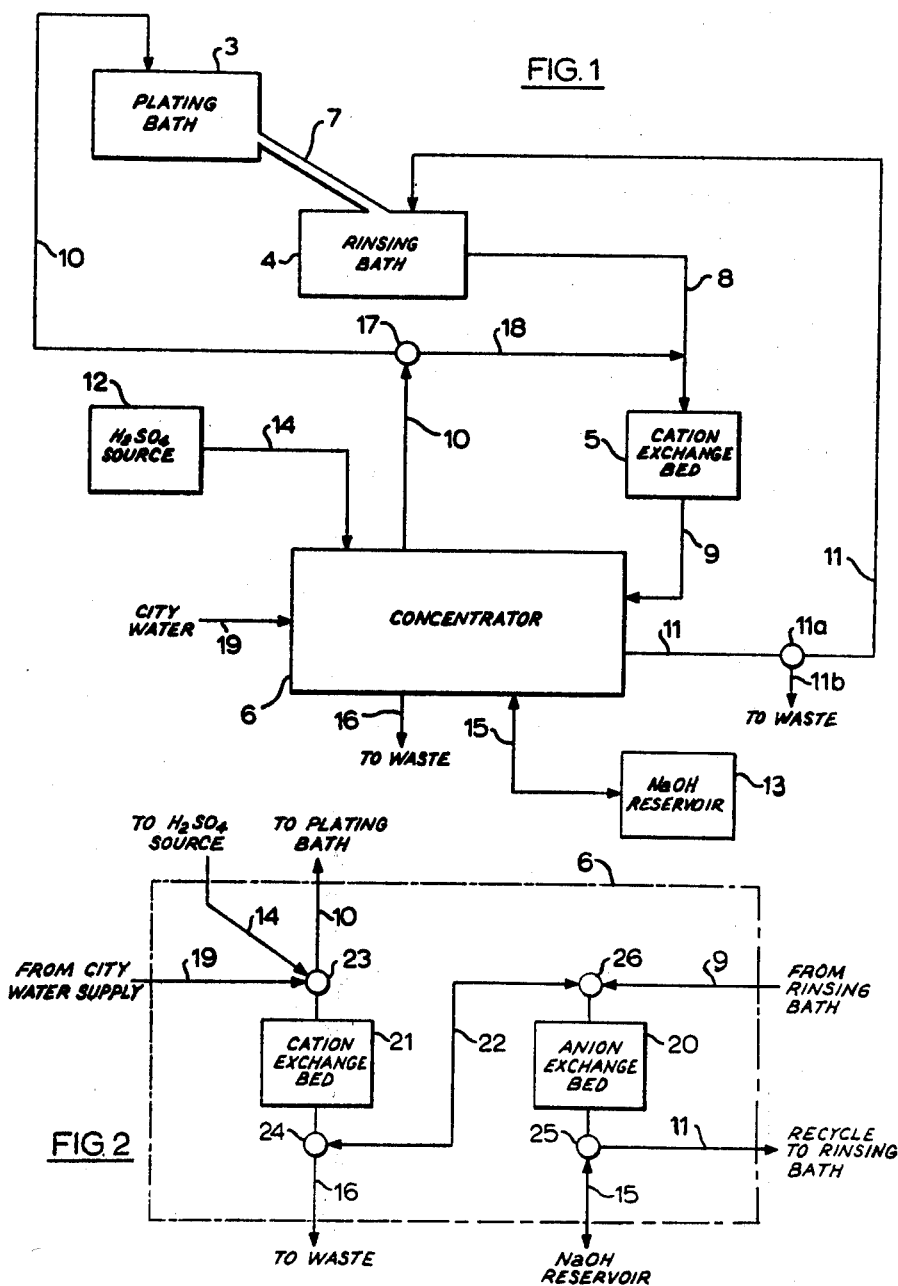

PROCESS AND APPARATUS FOR OBTAINING A MORE CONCENTRATED SOLUTION OF A COMPONENT USING ION EXCHANGE BEDS

This is a continuation of application Ser. No. 637,605, filed Dec. 4, 1975, which is a continuation of application Ser. No. 249,857, filed May 3, 1972, now abandoned.

This invention relates to a process and apparatus for obtaining a more concentrated solution of a component by means of ion exchange beds.

There are many industrial processes where it is necessary or desirable to use a process for obtaining a more concentrated solution of a particular component. Such a process can be used for example where the effluent from an industrial process contains a valuable component in dilute form. In many cases, effluent which could be used as feed for the process if the component were in a more concentrated form, is merely disposed of as waste into waterways, possibly causing undesirable pollution of the waterways as well as loss to the system of the valuable component.

An example of a process in which a process for concentrating a component in a solution can be used to good advantage is the process of chrome plating. Chrome plating may, for example, be carried out in an aqueous solution of chromic acid containing approximately $2 \times 10^5$ to $5 \times 10^5$ ppm chromic acid. Following the chrome plating operation, the plated articles are rinsed in water and the used rinse water contains approximately 100 to 500 ppm chromic acid. It is generally considered by Governmental authorities that an industrial effluent should not contain in excess of 1 ppm chromic acid. It can therefore be seen that it would be advantageous to concentrate the chromic acid in the used rinse water to a level at which it could be used as feed for the plating operation.

A variety of different processes have been used for the purpose of obtaining more concentrated solutions of components the most common being evaporation, but none of these processes have proved to be completely satisfactory in view of expense and other factors.

Some attempts have been made to use ion exchange beds for this purpose. Using ion exchange beds, the component to be concentrated is taken up from the dilute solution by passing the solution through a first ion exchange bed. The component is then taken up from the first bed by passing through the bed a regenerant solution containing a second component of opposite charge from the first component. The regenerant solution emerging from the bed is collected in a reservoir, and then passed through a second ion exchange bed in which the second component is taken up from the regenerant solution. In this way, where the regenerant solution is more concentrated than the dilute solution, a more concentrated solution of the component can be obtained as the product from the second bed.

To illustrate the above if one has a solution of a substance consisting of components A and B, and it is desired to obtain a more concentrated solution of component B, this can be accomplished by the following procedure.

Components A and B will be of opposite charge, and if the solution is passed through an ion exchange bed containing a component D of the same charge as component B and capable of exchanging with component B of the solution, component D will go into solution and component B will be taken up by the bed. To recover component B it is necessary to regenerate the bed with a solution which will take up component B from the bed. In order to do this it is necessary to use a regenerant containing a component of the same charge as component B and capable of exchanging with component B on the bed. This could be component D which was previously exchanged for component B. In addition to component D having the same charge as component B, the regenerant solution will necessarily contain a component of opposite charge to component D, and hence of opposite charge to component B. This component can be designated as C, and hence the regenerant solution can consist of a substance consisting of components C and D. This substance should be present in more concentrated form than the original solution of A-B.

When the solution C-D is passed through the bed, component D of the solution will exchange for component B of the bed, and the effluent from the bed will be a solution of C-B in a more concentrated form than the original solution of A-B.

It will then be necessary to separate component B from component C, and this is done in a second ion exchange bed of opposite charge from the first ion exchange bed and capable of taking up component C from the solution C-B. A bed containing component A could be used for this purpose, and when solution C-B is passed through the bed, the resulting solution will be a solution consisting of components A and B in more concentrated form than the original solution A-B.

The basic steps in this type of process are the taking up of component B in an ion exchange bed, the taking up of component B from the bed with a regenerant solution containing a component C of opposite charge to component B, and the taking up of component C from the resulting solution by passing it through a bed of opposite charge.

To recover chemicals left in the beds as void volumes, both beds are rinsed following passage of the regenerant solution through them and the products of the rinsing operations are collected.

Ion exchange bed processes have not been used industrially to any great extent for concentrating components in solutions because it has not been demonstrated that there is any clear economic advantage in using such processes. One of the main costs of operating the ion exchange process is the cost of chemicals used up in the process, and any reduction in the amount of chemicals used up makes the process more economical.

It is an object of this invention to provide a process and apparatus for obtaining a more concentrated solution of a component in which the consumption of chemicals used in the process is reduced.

According to the invention, the two ion exchange beds are coupled together so that the regenerant solution emerging from the first ion exchange bed is passed directly to and through the second bed without any intermediate step of collecting it in a reservoir, and the beds are rinsed by passing a single rinse solution through the second bed and then directly to and through the first bed countercurrent to the flow of the regenerant solution.

By carrying out the process in this manner, it is possible to minimize the consumption of chemicals used in the process, and in particular to minimize the loss of regenerant solution remaining as void volumes in the beds following passage of the regenerant solution through the beds.

Other objects and advantages of the invention will appear from the following description and the accompanying drawings, in which:

FIG. 1 is a schematic diagram illustrating the use of the process and apparatus of this invention in a process for concentrating used rinse water from a chrome plating process, and FIG. 2 is a schematic diagram in greater detail of the concentrator shown in FIG. 1.

The apparatus illustrated in FIG. 1 includes a plating bath 3, a rinsing bath 4, a cation exchange bed 5, and a concentrator 6. The plating bath 3 is connected to the rinsing bath 4 by conduit 7, the rinsing bath 4 is connected to cation bed 5 by line 8, the cation bed 5 is connected to concentrator 6 by line 9, and the concentrator 6 is connected to the plating bath 3 by line 10. The concentrator 6 is also connected to the rinsing bath 4 by line 11. Valve 11a in line 11 is adjustable to permit a bleed-off from line 11 through line 11b to waste.

In addition, the apparatus includes a source of sulphuric acid 12, and a sodium hydroxide reservoir 13. The sulphuric acid source 12 is connected to the concentrator 6 by line 14, and the sodium hydroxide reservoir 13 is connected to the concentrator 6 by line 15.

Line 16 leads from the concentrator 6 to waste. A valve 17 in line 10 is adjustable to divert solution coming from concentrator 6 through line 18 to line 8 for recycle through the concentrator. Line 19 connects the concentrator 6 to a source of city water.

As seen in FIG. 2, the concentrator includes an anion exchange bed 20 and a cation exchange bed 21. The top of the anion exchange bed 20 is connected to the bottom of the cation exchange bed 21 by line 22.

Valve 23 at the top of the cation exchange bed can be adjusted to connect the top of the cation exchange bed 21 either to line 10 to the plating bath 3, line 14 to the sulphuric acid source 12, or line 19 to the source of city water.

Valve 24 at the bottom of the cation bed 21 is adjustable to connect the bottom of the cation bed to line 16 to waste, or to line 22 and the top of the anion bed 20.

Valve 25 at the bottom of the anion bed is adjustable to connect the bottom of the anion bed 20 to line 11 and the rinsing bath 4 or to line 15 and the sodium hydroxide reservoir 13.

Valve 26 at the top of the anion bed is adjustable to connect the top of the anion bed 20 to the rinsing bath 4 through line 9, cation bed 5 and line 8 or to the bottom of the cation bed 21 through line 22.

Pumping means (not shown) are provided for moving the solutions throughout the system when necessary as described hereafter.

In operation, articles to be plated are plated in the chrome plating bath 3 and then transferred through conduit 7 to rinsing bath 4. The rinse water from the rinsing bath 4 is drawn off through line 8 and passed through cation exchange bed 5.

The bed 5 is a strong acid cation exchange bed in hydrogen form. When the process is carried out with an alkali metal chromate, such as sodium chromate, it will be converted to chromic acid in the cation exchange bed 5. Even where the plating is carried out with chromic acid, it is usually necessary to pass the solution through a cation exchange bed before passing it through the concentrator in order to remove cations which may be present such as $Cr^{3+}$, $Ni^{2+}$, $Fe^{3+}$ and $Na^+$. If the heavy metal cations are not removed, they will tend to precipitate in the anion bed under high pH conditions (pH > 6). The sodium cation, and any other alkali metal or alkaline earth metal cations, if not removed, will tend to produce a rise in pH if allowed to recirculate through the system. If the pH rises too far, the heavy metals will precipitate as indicated, and the anion exchange capacity will be shifted to a less efficient mechanism such as a monochromate mechanism.

The solution emerging from cation bed 5 is passed to concentrator 6 through line 9, and the bed 5 can be regenerated with a sulphuric acid solution such as a 1 N sulphuric acid solution.

The solution passing into the anion bed 20 is substantially chromic acid in water. Such a solution will in fact consist of a number of different chromium containing ions and some undissociated chromic acid ($CrO_3$). The chromium containing anions are for example, $Cr_2O_7^=$, $CrO_4^=$, $HCrO_4^-$ and higher chromate anions such as $Cr_3O_{10}^=$ and $Cr_4O_{13}^=$. The chromium containing anions are taken up by the anion exchange bed, and the undissociated chromic acid will dissociate to chromium containing anions as hydrogen ions are neutralized by hydroxyl ions of the bed.

The anion exchange bed is conveniently in hydroxide and lower chromate form. To the extent that the bed is in hydroxide from, hydroxyl ions of the bed will exchange for chromium containing anions of the solution. To the extent that the bed is in lower chromate form, it is capable of taking up higher chromium containing anions from the solution. For example, monochromate of the bed will react with dichromate and other higher chromates of the solution to remove them from the solution.

Referring again to FIG. 2, the valve 26 is first adjusted so that the solution from cation bed 5 passes through the anion bed 20 from top to bottom, and valve 25 is adjusted so that the solution emerging from the bottom of the anion bed which is substantially pure water passes into line 11 for recycle to the rinsing bath 4 or to waste.

When anion bed 20 becomes substantially loaded with chromium containing anions, valve 26 is adjusted to permit sodium hydroxide from the sodium hydroxide reservoir 13 to enter the bottom of the anion bed 20 through line 15, valve 25 at the top of the anion bed is adjusted to permit the effluent emerging from the top of the anion bed 20 to pass through line 22 to valve 24 at the bottom of the cation bed 21, valve 24 is adjusted to permit solution coming from the anion bed through line 22 to enter the bottom of the cation exchange bed, and valve 23 is adjusted to permit solution emerging from the top of the cation exchange bed 21 to pass through line 10 to the plating bath 3.

In the anion exchange bed, hydroxyl ions of the sodium hydroxide solution displace chromium containing anions of the bed, and the solution emerging from the anion exchange bed contains sodium cations and chromium containing anions and can be referred to as a sodium-chromate salt solution. The cation exchange bed consists of a cation exchange resin in hydrogen form, and in the cation exchange bed the sodium ions of the solution coming from the anion exchange bed exchange for hydrogen ions of the bed to produce a product of chromic acid which can be used in the plating bath 3.

When the chromium containing anions have been recovered from the anion exchange bed. the valve 23 at the top of the cation exchange bed 21 is adjusted so that city water will flow into the top of the cation exchange bed through line 19. Valves 24, 26 and 25 are left in the same position so that the city water will flow down through cation exchange bed 21, through line 22 to the top of anion exchange bed 20, down through anion exchange bed 20 and through line 15 to sodium hydroxide reservoir 13. The rinse water displaces the void volume in the cation exchange bed through line 22 and anion exchange bed 20 to sodium hydroxide reservoir 13, at the same time displacing the void volume in anion exchange bed 20 into the sodium hydroxide reservoir 13.

The city water used to rinse the beds will contain anions such as chloride, sulphate and nitrate, and cations such as calcium and magnesium, and these will be taken up by the anion and cation exchange beds respectively to some extent. However, in the amounts normally found in city water this will not cause any problems, and as rinse solution, any water solution can be used which does not contain any ions in an amount sufficient to unduly interfere with the operation of the process. In some cases, it may be found convenient to use a dilute solution of chromic acid obtained, for example, by diverting part of the chromic acid solution entering the anion bed 20 from the rinsing bath 4. In this case, the chromium containing anions in the rinse water solution will be taken up by the anion bed, but this should not interfere with the efficiency of the process.

As the rinsing is continued, the solution entering the sodium hydroxide reservoir will become substantially pure water, and will tend to dilute the sodium hydroxide in the reservoir. A certain amount of dilution will not cause any difficulty since it will be necessary to add sodium hydroxide to the system to replace that lost, and this can conveniently be done by adding concentrated sodium hydroxide to the sodium hydroxide reservoir.

However, as a practical matter, it is usually advisable to continue the rinse step for a time such that the amount of water entering the sodium hydroxide reservoir would cause too much dilution. In such case, the valve 25 can be adjusted to divert the effluent from the anion exchange bed 20 to waste, and the rinsing continued until the beds have been rinsed sufficiently.

When the rinsing has been completed valve 26 at the top of the anion exchange bed 20 is adjusted to permit the entry into the top of the anion exchange bed of used rinse water from rinsing bath 4, through line 8, cation bed 5 and line 9, and valve 25 is adjusted to permit the effluent from the bottom of the anion exchange bed 20 to pass through line 11 for recycle to rinsing bath 4.

At the same time, valve 23 at the top of cation exchange bed 21 is adjusted to permit the entry into the top of the cation exchange bed of sulphuric acid through line 14 from sulphuric acid source 12, and valve 24 is adjusted to permit the effluent from the bottom of the cation bed to pass through line 16 to waste. When the sulphuric acid passes through the cation exchange bed, hydrogen ions of the solution are exchanged for sodium ions of the bed, the bed is regenerated by removal of sodium, and the effluent from the bottom of the bed is sodium sulphate and any excess sulphuric acid. Immediately following the regeneration of the cation bed, it is advisable to remove the sulphuric acid by a short rinse with city water, and this can be accomplished by adjusting valve 23 to permit the entry of city water through line 19 to the top of the cation exchange bed 21, through the cation exchange bed and through line 16 to waste.

Following treatment of the used chromic acid rinse solution in the anion bed 20 and the regeneration of the cation bed 21, the cycle is repeated, valves 25, 26, 24 and 23 being adjusted to permit the passage of sodium hydroxide solution from the sodium hydroxide reservoir 13 through line 15 to the bottom of the anion exchange bed, through the anion exchange bed, through line 22 from the top of the anion exchange bed to the bottom of the cation exchanged bed, through the cation exchange bed and out of the top of the cation exchange bed through line 10.

The initial solution to emerge from the top of the cation exchange bed will be the void volume of city water in the cation exchange bed and the void volume of partially treated chromic acid rinse water from the anion exchange bed, and this can be separated from the concentrated chromic acid passing out of the cation exchange bed by adjustment of valve 17. The initial solution of void volumes can be diverted to waste, for separate treatment or through line 18 for re-cycling through the concentrator.

It can be seen that there are three basic stages to the process: a first stage during which a chromic acid solution is being treated in the anion exchange bed to remove chromium containing anions and produce a product of substantially pure water, and at the same time, the cation exchange bed is being regenerated with sulphuric acid to remove sodium ions therefrom and produce a product of sodium sulphate; a second stage during which the anion exchange bed is being regenerated with sodium hydroxide to remove chromium containing anions therefrom and produce a sodium-chromate salt solution which is passed directly to and through the cation exchange bed where the sodium ions are removed and a final product of chromic acid is obtained, and a third stage during which rinse water is passed into the top of the cation bed through the cation bed, directly to the top of the anion bed, through the anion bed and into the sodium hydroxide reservoir.

At the end of the first stage, the anion exchange bed is partially loaded with chromium containing anions and the bed contains a void volume of partially treated chromic acid solution; the cation bed is regenerated and contains a void volume of city water. At the end of the second stage, the anion bed is regenerated and contains a void volume of sodium hydroxide and some sodium-chromate salt solution, the cation bed is partially loaded with sodium and contains a void volume of sodium hydroxide and sodium-chromate salt solution and some chromic acid. At the end of the third stage both beds contain void volumes of city water.

The two principal features of the process described are firstly, that the regenerate solution emerging from the anion bed is passed directly to and through the cation bed, and secondly, the manner in which the beds are rinsed. According to the process described the cation bed is rinsed by passing the rinse solution through the bed in a direction opposite to the direction in which the regenerant solution passed through the bed, and the anion exchange bed is rinsed with the rinse solution emerging from the cation exchange bed by passing the rinse solution directly from the cation exchange bed to the anion exchange bed and through the anion exchange bed in a direction opposite to the direction in which the regenerant solution passed through the anion bed.

These features have a significant effect upon the amount of chemicals lost to the system, and hence upon the economics of the process. The effect of these features upon the operation of the process can best be understood by a description of the nature of the solutions passing through the beds during the passage of the regenerant solution and the rinse solution through the beds, and the void volumes found in the beds at the end of the regeneration stop.

Consideration will be given firstly to the feature whereby the regenerant solution emerging from the anion bed is passed directly to and through the cation bed. When the anion bed is regenerated with sodium hydroxide, the sodium hydroxide passes through the bed taking up chromium containing anions from the bed, and a sodium-chromate salt solution leaves the top of the anion bed. At first the solution leaving the top of the anion bed is practically pure sodium-chromium salt solution, then it is a mixture of sodium-chromium salt solution and sodium hydroxide, and finally, when the bed is regenerated, it is substantially pure sodium hydroxide. According to prior art processes, the solution emerging from the anion exchange bed would be collected in a reservoir forming a solution having a uniform concentration of sodium hydroxide and sodium-chromate salts, and this solution would then be passed from the reservoir to and through the cation exchange bed.

In the cation exchange bed, the sodium-chromate salts are converted to chromic acid, and any sodium hydroxide is converted to water. To the extent that the sodium hydroxide is converted to water there is a loss of sodium hydroxide to the system. According to the prior art process, where a composition having a uniform concentration of sodium hydroxide and sodium-chromate salts is passed through the bed, the bed will at first take up sodium ions, but the sodium ions will be taken up from the sodium hydroxide and the sodium chromate salts substantially in accordance with the proportions in which these compounds are found in the solution. In this way, a substantial amount of the sodium hydroxide will be converted to water and lost to the system.

Using the process of this invention whereby the solution leaving the anion exchange bed is passed directly to the cation exchange bed, the first solution to pass through the cation exchange bed is substantially pure sodium-chromate salt solution. This is followed by a mixture of sodium hydroxide and sodium-chromate salts and finally by a solution of virtually pure sodium hydroxide. The cation exchange bed is at first in a highly regenerated state, and will readily take up sodium ions from the solution passing therethrough. At this stage, the solution passing therethrough is substantially pure sodium chromate salts. As the bed becomes more loaded with sodium, its ability to pick up sodium ions decreases, so that by the time pure sodium hydroxide reaches the cation exchange bed, the bed is so loaded with sodium ions that little of the sodium hydroxide will be converted to water, and it will be retained in the bed where it can be recovered for re-use as described hereafter.

Thus, by passing the regenerant solution directly from the anion exchange bed to the cation exchange bed it is possible to increase the efficiency of the process and the loss of chemicals by using the cation bed in its most active form for converting sodium chromate salts to chromic acid, the object of the process, and decrease the use of the bed in active form for converting sodium hydroxide to water which is not the object of the process, and which in fact results in a loss of sodium hydroxide to the system.

Consideration will next be given to the novel rinsing method of the invention. Following completion of the passage of the regenerant solution through the beds, the cation exchange bed contains as void volume substantially pure chromic acid at the top, sodium-chromate salts in the middle, and sodium hydroxide at the bottom, and the anion exchange bed contains as void volume a small amount of sodium chromate salts at the top with the rest of the void being primarily pure sodium hydroxide.

If both beds are rinsed separately as in the prior art processes, the effluent from the cation exchange bed will be a sodium-chromate salt solution. This sodium-chromate salt solution is either diverted to waste or converted separately to usable regenerant.

However, when the beds are coupled together, and rinsing is carried out as described in a single step, the solution from the cation exchange bed passes directly into the anion exchange bed. This solution is at first sodium hydroxide, then sodium-chromate salts and then chromic acid. At this stage, the anion exchange bed is highly regenerated, and therefore the sodium-chromate salts are converted to sodium hydroxide which goes to the sodium hydroxide reservoir where it can be used for regeneration. Any chromic acid would be converted to water and also goes to the sodium hydroxide reservoir where it merely tends to dilute the solution in the sodium hydroxide reservoir and in effect act as make-up water.

While the above detailed description relates to a process for obtaining a more concentrated solution of chromic acid, it can be seen that the invention is applicable to any process for obtaining a more concentrated solution of a component in which a first solution containing the component is passed through a first ion exchange bed capable of taking up the component from the first solution, a second solution capable of taking up the component from the first bed and containing a second component of opposite charge to the first component is passed through the first bed and then through a second ion exchange bed capable of taking up the second component from the second solution, and both beds are rinsed following passage of the second solution therethrough.

This process could be used for example in concentrating solutions of nickel sulphate and nickel chloride from a nickel plating process. In this case it would be the nickel cation which would be of primary importance as opposed to the chromium containing anion of the chrome plating process, and the nickel solutions would be passed first through a cation bed and then through an anion bed.

According to this invention, processes of this general type are carried out by passing the second solution directly from the first bed to and through the second bed, and the beds are rinsed by passing a rinse solution through the second bed and then directly to and through the first bed in a direction opposite to the direction in which said second solution is passed through said beds.

The second ion exchange bed can be regenerated following the rinse step by passing through the second bed a solution capable of taking up the second component from the second bed.

In order to achieve maximum efficiency, it is preferred to pass the solutions through the beds vertically and so that a particular solution is passed through a bed from the top if it is less dense than the solution previously passed through the bed, and is passed through the bed from the bottom if it is more dense than the solution previously passed through the bed. Thus, for example, if the second solution is more dense than the first solution, it would preferably be passed through the anion exchange bed from the bottom, and if it is less dense than the first solution, it would preferably be passed through the anion exchange bed from the top. Also, if the rinse solution is less dense than the second solution, it would preferably be passed through both beds from the top, and if it is more dense than the second solution, it would preferably be passed through both beds from the bottom.

Operation in this manner substantially reduces intermixing of the substances, and a more detailed explanation of the operation of an ion exchange process in this manner is given in U.S. Pat. No. 3,385,788 granted to Robert F. Hunter on May 28, 1968. The importance of following this method of operation will of course depend upon the degree of difference in density between the two solutions, and is not as important where the difference in density is small as it is where there is a substantial difference in density.

In addition, it is most advantageous to operate the process in such a way that at least 50% of the length of the beds are active during passage of solutions therethrough. The advantages of this type of operation are described in U.S. Pat. No. 3,386,914 granted to Robert F. Hunter on June 4, 1968. According to this method of operation the solutions are passed through the beds at a rate of flow and for a period of time such that, in the case of a solution treatment step, at least 50% of the length of the bed in contact with the solution being treated is actively taking up the component from the solution throughout the step, and in the case of a regeneration step, at least 50% of the length of the bed in contact with the regenerant is actively giving up component to the regenerant through the step. The main advantage of this method of operation is that it minimizes the amount of resin necessary for a given component transfer operation, and operation in this manner generally involves relatively short beds and short cycle times. The preferred bed length and cycle times for a particular system can be determined in accordance with the description in the said U.S. Pat. No. 3,386,914.

In particular, it is preferred that the first solution is passed through the first bed at a rate of flow and for a period of time such that at least 50% of the length of the bed is actively taking up the first component from the first solution during the passage of the first solution through the first bed.

Preferably, also, the second solution is passed through the first and second beds at a rate of flow and for a period of time such that at least 50% of the length of the first bed is actively giving up the first component to the second solution during passage of the second solution through the first bed, and at least 50% of the length of the second bed is actively taking up the second component from the second solution during passage of the second solution through the second bed.

Where the process of this invention is used to obtain a more concentrated solution of chromic acid, the first solution is a solution of chromic acid, the solution is an aqueous solution of an alkali metal hydroxide, preferably sodium hydroxide, the rinse solution is a water solution, the first bed is an anion exchange bed, the second bed is a cation exchange bed.

A cation exchange bed can be regenerated following the rinsing step by passing therethrough a third solution capable of taking up alkali metal ions from the bed. Preferably, the third solution is aqueous sulphuric acid, and the cation bed is rinsed with city water immediately following the passage of the sulphuric acid therethrough.

As indicated, it is preferred that all solutions are passed vertically through the beds, and to reduce intermixing that the less dense solutions are passed through the beds from the top and the more dense solutions are passed through the from the bottom. In the case of the concentration of a chromic acid solution, it has been found that an advantageous mode of operation is to pass the chromic acid solution through the anion exchange bed from the top, to pass the second solution through both beds from the bottom, to pass the rinse solution through both beds from the top, and to pass the third solution through the cation exchange bed from the top.

The chromic acid solution passing into the anion exchange bed need not be pure chromic acid, but should not contain any heavy metals or alkali or alkaline earth metal cations in quantities sufficient to interfere unduly with the efficiency of the beds. Where the chromic acid solution is obtained by treatment of an alkali metal chromate solution in a cation exchange bed, no pre-treatment should be necessary, but where the chromic acid solution is used rinse water from a chromic acid plating process, it will usually be necessary to pre-treat the solution in a cation exchange bed in order to obtain a chromic acid solution of a purity suitable for use in the process.

The rinse water solution can be any water solution which does not contain any anions or cations in quantities sufficient to unduly interfere with the operation of the process. City water is a suitable rinse water solution as is a dilute solution of chromic acid.

Preferably, the solution remaining in the anion exchange bed following passage of the chromic acid solution therethrough, and the solution remaining in the cation exchange bed following passage of the sulphuric acid solution and city water therethrough, are separated from the rest of the solution passing out of the cation exchange bed during passage of the rinse solution through the beds. The solution so separated may be diverted to waste or recycled to the anion exchange bed.

The process of the invention can be carried out using an apparatus comprising a first ion exchange bed capable of taking up the component from the solution and connectable to a source of said solution and to a reservoir for a second solution capable of taking up the component from the first bed and containing a second component of opposite charge to said first component, and a second ion exchange bed capable of taking up the second component from the second solution and connectable at one end to a source of rinse solution and at the other end to the end of the first bed opposite to the end at which the first bed is connected to the reservoir for the second solution. With such an apparatus, when the first bed is connected to the source of the first solution, said solution will flow through the first bed. When the first bed is connected to the reservoir for the second solution and said other end of the second bed is connected to the first bed, the second solution will flow from the reservoir through the first bed and directly to and through the second bed from said other end of the second bed. When said one end of the second bed is connected to the source of rinse solution, the other end of the second bed is connected to the first bed, and the first bed is connected to the reservoir for the second solution, rinse solution will flow through the second bed from said one end thereof, directly to and through the first bed and into the reservoir for the second solution.

Preferably, the second bed is connectable at the top to a source of a third solution capable of taking up the second component from the second bed. In this way the third solution can be passed through the second bed following passage of the rinse solution therethrough.

Where chromic acid is the solution to be concentrated, the first bed is an anion exchange bed capable of taking up chromium containing anions from the chromic acid solution, the second solution is an alkali metal hydroxide in water, and the second ion exchange bed is a cation exchange bed in hydrogen form capable of taking up alkali metal ions from the second solution. Preferably the cation exchange bed is connected at the top to a source of a third solution capable of taking up alkali metal ions from the cation exchange bed. In this case, also, the apparatus can include a cation exchange bed for treatment of the chromic acid solution before it passes into the anion exchange bed.

The following examples illustrate applications of the process and apparatus of this invention.

EXAMPLE I

Two ion exchange beds 7.6 cm. high and 40.6 cm in inside diameter were coupled together so as to permit operation in the manner illustrated in FIGS. 1 and 2 and as described above. The first bed was filled with an anion exchange resin (7 liters "DOWEX" $1-\times 8$, 100–200 mesh), and the second bed was filled with a cation exchange resin (7 liters of "DOWEX" 50 w-x 8, 100–200 mesh). The resin was retained at both ends of the beds by suitable screens, and inlet baffles were used for distributing the solutions over the bed flow area.

Dilute electrolyte having an average concentration of 0.136 gms. $CrO_3$/liter was pumped from a chromium electroplating rinse tank, passed through a suitable filter, in order to remove particulate matter, and then through a 30.5 cm. high cation exchange resin bed (10 liters "DOWEX" $50-\times 8$, 20–50 mesh). The solution from this cation exchange bed was passed into the anion exchange bed described above. The 30.5 cm high cation bed was regenerated manually every 2–15 days with a sulphuric acid solution.

The plating rinse water solution was pumped through the anion bed at 48 liters per minute for 25 minutes. The effluent from the anion bed was essentially free of chromium and was recycled to the rinse tank. At the same time, the 7.6 cm. high cation exchange bed was being regenerated with 1176 gms. of sulphuric acid (as 100%) followed by rinsing with tap water. The conditions for the regeneration are shown in the table following the examples.

After 25 minutes, the flow of plating rinse water was stopped, and valves were positioned to permit a displacement of the void volumes of both beds by a sodium hydroxide solution pumped into the bottom of the anion exchange bed. The displaced void volumes consisting of water from the cation bed and dilute chromic acid from the anion bed emerged from the top of the cation bed. When essentially all of the void volumes (9.88 liters) had been displaced by the sodium hydroxide regenerant, the flow from the cation bed was diverted to collect 8 liters of concentrated electrolyte product. The displaced void volume went to sewer after appropriate treatment for removal of small quantities of chromium VI.

The concentrated electrolyte product had the following composition:
$CrO_3$: 44.2 gms./liter.
$SO_4^=$: 0.16 gms./liter.
fluoride: same ratio of $Fl/Cr^{+6}$ as in the plating bath.
$Cl^-$: 0.09 gms./liter.
$Cr^{+3}$: 0.00.

The displacement and product flow rates were 2 and 6 liters/minute respectively. During each cycle 480 gms. of sodium hydroxide (as 100%) were consumed, and this was replenished automatically in order to maintain a constant average regenerant concentration.

When the 8 liters of product were collected the valves were re-positioned, and tap water entered the top of the cation bed at a flow rate of 4 liters per minute. The void fluid, consisting of chromic acid, sodium chromium compounds and sodium hydroxide (5.2 liters in each bed and 0.5 liters between the beds) was displaced back through the beds, emerging from the bottom of the anion bed essentially as a sodium hydroxide solution suitable for re-use. The flow of tap water continued in order to supply dilution water for make-up regenerant concentrate and additional rinsing. After sufficient dilution water was obtained, the waste effluent was diverted to sewer, and allowed to flow for 30 seconds. The cycle was then repeated.

The total cycle time was 36 minutes and the net flow rate was 33.4 liters/minute. 98% of the chromic acid in the electroplating rinse was recovered. The losses were found to occur largely in the acid regenerant effluent from the cation bed. The concentrated electrolyte was recycled to the plating operation and replaced in part with water and electrolyte make-up.

EXAMPLE II

The second run was performed with the same equipment as described in example I, but the plating rinse concentration, plating rinse treatment time, acid water wash flow rate and chemical consumption was changed. The operating conditions are shown in the table at the end of the examples.

A product have a concentration of 55.4 gms. $CrO_3$ liter was obtained, with 97% recovery of electrolyte. The input used chromic acid rinse water contained an average of 4.90 gms. $CrO_3$ liter.

EXAMPLE III

A third run was performed using the same equipment as described in example I but plating rinse concentration, plating rinse treatment time and sodium hydroxide consumption were altered from the conditions employed in example II.

The operating conditions are shown in the table following the examples.

A product having a concentration of 78.9 gms. $CrO_3$/liter was obtained with 97% recovery of electrolyte. The input used chromic acid rinse water contained an average of 7.74 gms. $CrO_3$/liter.

| OPERATING CONDITIONS OF EXAMPLES I to III | | | |
|---|---|---|---|
| | EXAMPLE | | |
| VARIABLE | 1 | 2 | 3 |
| PLATING RINSE TREATMENT TIME, MIN. | 25 | 15 | 10 |
| CAUSTIC RINSE TIME, MIN. | 0.50 | 0.30 | 0.49 |
| CYCLE TIME, MIN. | 36 | 26 | 21 |
| PLATING RINSE FLOW RATE, 1./MIN. | 28.0 | 51.5 | 54.0 |
| VOID DISPLACEMENT FLOW RATE, 1./MIN. | 2 | 2 | 2 |
| PRODUCT FLOW RATE, 1./MIN. | 6 | 6 | 6 |
| REVERSE DISPLACEMENT FLOW RATE, 1./MIN. | 4 | 4 | 4 |
| ACID REGENERANT FLOW RATE 1./MIN. | 2 | 2 | 2 |
| ACID WATER WASH FLOW RATE 1/.MIN. | 2 | 4 | 4 |
| NET FLOW RATE, 1./MIN. | 33.4 | 29.8 | 24.3 |
| DISPLACEMENT VOID VOLUME, 1. | 9.88 | 9.88 | 9.88 |
| PRODUCT VOLUME, 1. | 8.0 | 8.0 | 8.0 |
| INLET CONCENTRATION, (Average) gm. $CrO_3$/1. | 0.316 | 4.90 | 7.74 |
| ACID CONSUMPTION, gm. $H_2SO_4$/CYCLE | 1177 | 945 | 945 |
| CAUSTIC CONSUMPTION, gm. NaOH/CYCLE | 480 | 420 | 480 |

We claim:

1. A process for removing chromium containing anions from used rinse water from a chrome treatment operation and producing a concentrated solution of chromic acid, in which the used rinse water is passed through a cation exchange bed to remove cation impurities and then through an anion exchange bed in hydroxyl form from the top to remove chromium containing anions, a concentrated aqueous alkali metal hydroxide solution is then passed from a reservoir through said anion exchange bed from the bottom to produce a concentrated solution of chromium containing anions at the top of said anion exchange bed, said concentrated solution of chromium containing anions is then passed directly to and through a second cation exchange bed in hydrogen form from the bottom to produce at the top of said second cation exchange bed a concentrated solution of chromic acid, and displacement water is then passed through said second cation exchange bed and directly to and through the anion exchange bed in the same flow path as but in a direction opposite to the direction in which said concentrated solution of chromium containing anions and said alkali metal hydroxide solution passed through said beds, to displace the liquids remaining in said beds and connecting conduits into the reservoir for said alkali metal hydroxide solution.

2. A process as claimed in claim 1, in which said displacement water is city water.

3. A process as claimed in claim 1, in which said displacement water is a dilute chromic acid solution.

4. A process as claimed in claim 1, in which said alkali metal hydroxide is sodium hydroxide.

5. A process as claimed in claim 1, in which an aqueous solution of sulphuric acid is passed through the second cation exchange bed from the top following passage of the displacement water therethrough and said bed is rinsed with city water from the top following passage of the sulphuric acid therethrough.

* * * * *